Oct. 16, 1951  S. A. OCHS ET AL  2,571,474
POWER TRANSMITTING MECHANISM
Filed July 29, 1947  4 Sheets-Sheet 2

INVENTORS.
Sidney A. Ochs
Otto L. Fishburn
BY
Harness & Harris
ATTORNEYS.

Oct. 16, 1951  S. A. OCHS ET AL  2,571,474
POWER TRANSMITTING MECHANISM
Filed July 29, 1947  4 Sheets-Sheet 4

INVENTORS.
Sidney A. Ochs.
Otto E. Fishburn.
BY
Harness & Harris
ATTORNEYS.

Patented Oct. 16, 1951

2,571,474

UNITED STATES PATENT OFFICE 2,571,474

POWER-TRANSMITTING MECHANISM

Sidney A. Ochs and Otto E. Fishburn, Detroit, Mich., assignors to Chrysler Corporation, Highland Park, Mich., a corporation of Delaware Application July 29, 1947, Serial No. 764,410

25 Claims. (Cl. 192—53)

1

This invention relates to power transmission mechanism and refers particularly to improvements providing control over the movement of the shiftable member of jaw or dental clutches employed in power transmissions of motor vehicles for selecting one or more speed ratio drives between the engine and vehicle propeller shaft.

For the purpose of illustrating our invention we shall make reference to clutches of the synchromesh or blocker type employed in passenger car transmissions and to the form of clutch employed in truck transfer cases, wherein, for example, a shiftable toothed clutch member splined to a shaft or hub is operable from a neutral disengaged position to one or two engaged positions. It will be understood, however, that the invention is applicable to clutches employed in other situations.

A problem encountered with clutches of the foregoing type has been the tendency of the shiftable member to "creep" and/or "walk" out of mesh when undergoing torque, especially under coast torque conditions in low speed drive ratios.

We have discovered that these difficulties may, for example, be overcome and a simple and effective control structure be obtained by providing a split hub construction between the shaft and shiftable clutch member, one of the hub portions being fitted to the shaft splines and the other being loose on the shaft splines to effect a limited relative rotation between these members which is multiplied at the outer teeth or splines on which the shiftable member is non-rotatably carried. Thus when the shiftable clutch member is in an engaged position and connected to only one of the hub sections, the relative rotation between the hub sections may be utilized to block disengagement of the shiftable member by causing the loose hub section to be rotated to the limit of its lost motion such that the teeth or splines of the hub sections become misaligned. Moreover, the arrangement may be made effective in either engaged position of the clutch member.

Accordingly, it is the general object of my invention to provide mechanism for controlling creep and walking out-of-mesh tendencies of interengaged clutch members during rotation thereof.

Another object is to provide a clutch mechanism comprising interengageable drive transmitting members so constructed and arranged for automatically holding the same in engaged relationship when torque is being transmitted therethrough yet permitting disengagement at the

2 will of the operator when the torque is released.

A further object is to provide a clutch mechanism comprising a toothed clutch element shiftable from a neutral position into engagement with a second toothed clutch element to establish a predetermined speed ratio drive or into engagement with a third toothed clutch element to establish a different speed ratio drive and wherein the supporting structure for the shiftable element in one position of engagement is adapted to prevent walking out of mesh of the shiftable element when in its other engaged position.

A further object is to provide a clutch mechanism as in the preceding object wherein disengagement of the shiftable member is blocked in either engaged position.

Another object of the invention is to provide clutch mechanism of the above character wherein blocking of the shiftable member from disengagement occurs automatically while the shiftable clutch element is subject to torque transmission.

Still another object is to provide clutch mechanism for an automatic transmission wherein blocking of the shiftable member to prevent self-disengagement occurs incident to engagement of this member.

A still further object of the invention is to provide a clutch mechanism including an element for blocking shift of the shiftable clutch member and means for constantly biasing the blocking element in blocking relation to the shiftable member.

Another object is to provide a clutch mechanism for automotive transmissions wherein a shiftable clutch element is operable to a plurality of speed ratio drive positions and may be blocked in any of its engaged positions when subject to torque transmission.

A further object is to provide a clutch mechanism having a two-step blocking arrangement.

It is also an object to provide an efficient mechanism for carrying out the above objects, that is simple in construction and well adapted to production manufacture.

Other objects and advantages of our invention will become more apparent from the following description taken in connection with the accompanying drawings wherein.

Figure 1:
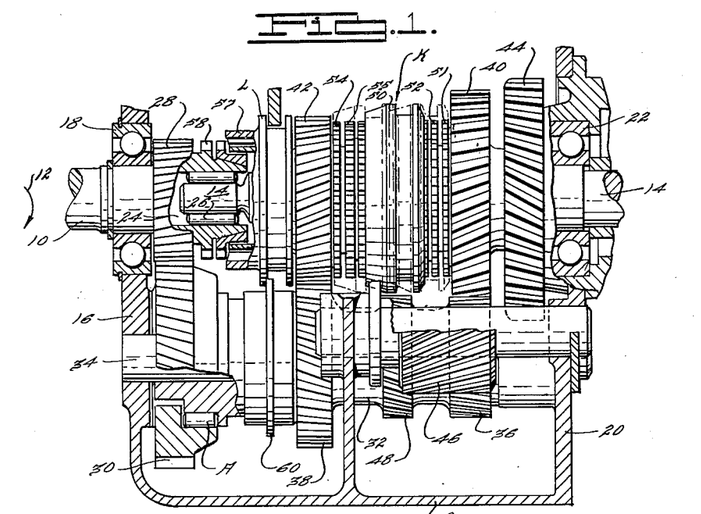
Fig. 1 is a longitudinal section through a lay shift transmission in current use providing four speeds forward and reverse, to which our invention has been applied.

Referring to the drawings in which similar numerals refer to similar parts throughout the several views, the numeral 8 is a casing for housing the transmission of Fig. 1. Drive from any suitable source, such as an internal combustion engine through a master clutch and a fluid coupling (all not shown) is transmitted to the driving shaft 10 which has a direction of rotation (clockwise looking rearwardly of the transmission) indicated by the arrow 12 in Fig. 1, thence through the speed ratio gearing to the output shaft 14. The forward end wall 16 of the casing has a ball bearing unit 18 mounted therein which journals the shaft 10. The rear wall 20 of the casing has a ball bearing unit 22 mounted therein which journals the output shaft 14, the latter extending forwardly to pilot in a bore 24 of the shaft 10 and journal therein on the needle bearings 26, all as shown, for example, in Fig. 1.

The shaft 10 carries the main drive pinion 28 which is in constant mesh with a gear 30 which drives the lay or countershaft 32 journalled on a fixed rod 34, through an overrunning clutch A of conventional type, such that when the shaft 10 drives in the direction of the arrow 12 the clutch A will engage to clutch the gear 30 to the countershaft 32 whenever the gear 30 tends to rotate faster than the countershaft. However, whenever the gear 30 tends to rotate slower than the countershaft 32 then the clutch A will automatically release whereby the shaft 10, under certain conditions, may readily drop its speed while the countershaft 32 continues to revolve.

The countershaft 32 comprises cluster gears 36, 38, the former providing drives in first and reverse and the latter providing drive in third speed. Freely rotatable on the shaft 14 are the first and third speed driven gears 40 and 42, respectively, in constant mesh with countershaft gears 36 and 38 respectively. The shaft 14 carries a reverse gear 44 and a reverse idler gear 46 constantly in mesh with the gear 36 is shiftably mounted for meshing with the reverse gear 44 to establish reverse drive. A gear 48 drives the transmission governor through means not shown.

Figure 2:
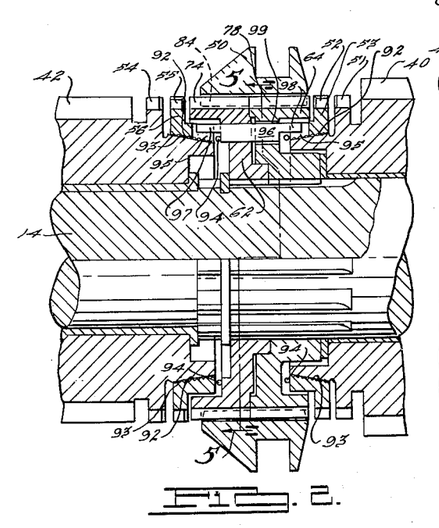
Fig. 2 is an enlarged cross-sectional view of the manual selector synchromesh clutch of Fig. 1 embodying our invention.
Figure 3:
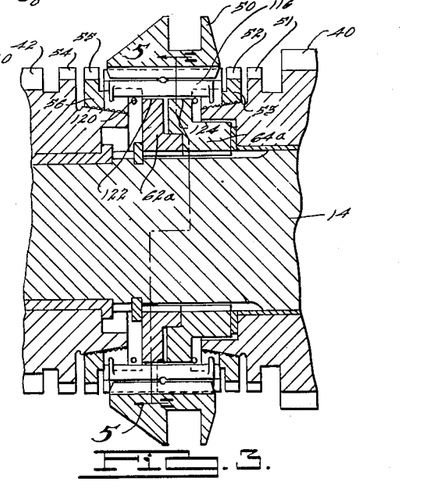
Figs. 3 and 4 are cross-sectional views taken similarly to that of Fig. 2 but employing a modified form of clocking means between the blocker or synchronizing control ring and the hub member.
Figure 4:
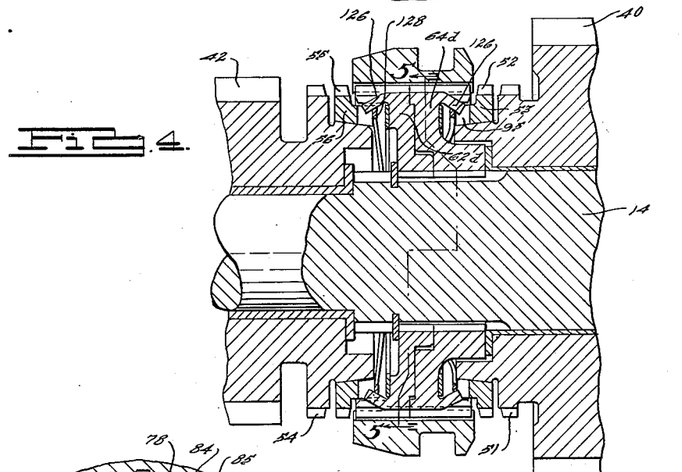

A manually operable clutch mechanism K (Fig. 1) various forms of which are shown for example, in Figs. 2, 3, and 4 respectively, is located between the gears 40 and 42 and comprises a shift device, clutch sleeve, or speed control member 50 adapted to be selectively shifted manually, from a neutral position, shown in Fig. 1, either rearwardly to clutch with the set of clutch teeth 51 of the first speed gear 40 after passing between teeth 52 of a conventional conical synchronizer or blocking member or ring 53 supported by the gear 40 or else forwardly to clutch with the set of clutch teeth 54 of the third speed gear 42 after passing between the teeth 55 of a conventional conical synchronizer or blocker member or ring 56 supported by the gear 42.

A second clutch L (Fig. 1) has a clutch sleeve 57 carried by a hub (not shown) splined to the shaft 14. The sleeve 57 is shiftable forwardly under power by means (not shown) at predetermined vehicle speeds to clutch with the set of clutch teeth 58 of the gear 28 to establish second speed and fourth speed respectively, as hereinafter described.

In operation of the mechanism the first speed drive is obtained by shifting the sleeve 50 rearwardly to clutch with the teeth 51, the drive passing from shaft 10 to pinion 28 thence through gear 30 to countershaft 32 and from the latter through gears 36, 40 and sleeve 50 to the output shaft 14. The third speed ratio drive is obtained by shifting the sleeve 50 forwardly to clutch with the teeth 54, the drive passing to the countershaft 32 as before and thence through the gears 38, 42 and sleeve 50 to the shaft 14.

At predetermined vehicle speed, for instance, 6 miles per hour, when operating in first speed ratio drive the sleeve 57 will be moved forwardly and upon release of the accelerator (not shown) will engage with the teeth 58 to establish second speed ratio drive. Similarly when operating in third speed ratio drive and a predetermined vehicle speed, for instance 12 M. P. H. the sleeve 57 may be engaged with the teeth 58 to establish fourth speed ratio drive. In each of the above instances the sleeve 57 will positively clutch the shaft 10 directly to the gear 42 and so long as drive torque is transmitted from the shaft 10 to the shaft 14 through the sleeve 57 the clutch A will overrun, it being noted in this connection that the countershaft 32 will then be rotating faster forwardly than the gear 30; also that during forward shift of the sleeve 57 the clutch is neutralized by a control sleeve 60.

Reverse speed ratio drive is obtained as above indicated by shifting the idler gear 46 rearwardly to mesh with the gear 44, sleeve 50 being then in neutral and the drive passing to the countershaft 32 as before, and thence through the gears 36, 46, 44 to the shaft 14.

As previously stated, under certain drive conditions, depending upon the transmission construction and power transmitted thereby, there is a tendency for the manually shiftable clutch K to become disengaged from its engaged position by "walking out" of mesh. This tendency is more evident during coast drive conditions when the transmission is in a low speed ratio drive. It is an important feature of this invention to prevent the shiftable clutch member from becoming disengaged during the various drive conditions possible except at the will of the operator.

Figure 5:
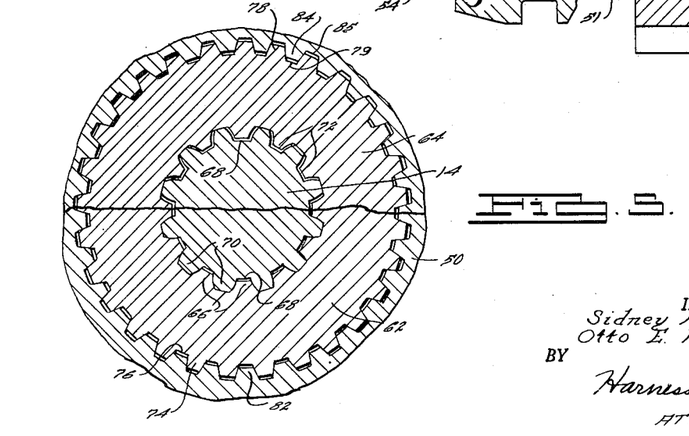
Fig. 5 is a cross-sectional view taken at 5—5 of Figs. 2, 3, and 4 respectively.

To effect this result the clutch K is, among other things, provided with a split hub construction intermediate the shift member 50 and shaft 14. Thus in Fig. 2, for example, the hub comprises tandem coaxial hub or blocker sections 62 and 64 respectively, intermediate an outer member, as the shift sleeve 50, and an inner member, as the shaft 14, each section preferably having a connection with the shaft 14 as by a splined, i. e., tongue or tooth and groove engagement therewith. The internal splines, tongues, or teeth 66 of the hub section 62 (see Fig. 5) are preferably made to fit the splineways or grooves 68 between the splines, tongues, or teeth 70 of the shaft 14, preferably, without backlash. The internal splines, tongues, or teeth 72 of the section 64 however, are purposely made slightly thinner on each side of their axes than the splines 70 such that the teeth 72 are of less thickness than the width of the splineways 68 of the shaft 14 and thus thinner than the teeth 66 of the hub section 62, by an amount, for example, between $2/1000$ to $10/1000$ of an inch, preferably, about $5/1000$ of an inch, which latter figure has been found to be suitable in actual practice, so as to provide for a limited relative rotational, oscillatory or clocking movement of the hub section 64 with respect to the shaft 14 and consequently, also with respect to the hub section 62 by means of the teeth 72 and splineways 68 which I may for convenience, term a clocking or lost motion means.

The hub section 62 has external clutching teeth or tongues 74 circumferentially spaced by recesses or grooves 76 and the hub section 64 has similar clutching teeth 78 and spaces 79 respectively, that is, similar in size and spacing. The teeth 74 and 78 are preferably aligned axially when the axes of their respective internal teeth are also aligned axially. The ends of the external hub teeth are preferably square with the axis of rotation where the hub sections substantially abut, thus providing the lateral or end faces 80 on the teeth 74 and similar end faces 81 on the teeth 78 which, when the hub sections are at the limit of the relative rotation permitted by the lost motion in the loose splined connection of the hub 64, overlap to provide a blocking means or shoulder, for example, the blocking shoulders 82 in Fig. 7 or the blocking means or shoulders 83 in Fig. 8 dependent upon the transmission setting and drive conditions.

The shift device 50 has internal clutching teeth 84 circumferentially spaced by spaces 85 which teeth are slidably interengageable with the external teeth 74 and 78 of the hub sections and provide a selective connection with these teeth 74 and 78, the teeth 84 being in engagement with both teeth 74 and 78 when the device 50 is, for example, in the neutral position of Figure 1 and being disengaged with respect to the teeth 74 or 78 when the device 50 is in a drive position as hereinafter described. The opposite ends 86, 87 of the teeth 84 are preferably, as shown, chamfered at each side of the tooth axis to provide pointed teeth for facilitating shifting of the sleeve 50. Thus the forward ends 86 of the teeth 84 have the angular faces 88 and 89 and the rear end 87 of these teeth the angular faces 90 and 91. The included angle between these angular faces is preferably in the order of 90° to facilitate easy manual shifting and blocking with respect to shoulders 82 and 83 aforesaid.

The clutch teeth 51, 54 and blocker teeth 52, 55 are similarly pointed and have a circumferential pitch and pitch diameter similar to the teeth of the shift sleeve 50. The blocker rings 53, 56 are also provided with internal cone-shaped threaded surfaces 92 which are adapted to frictionally engage complementary cone-shaped clutch surfaces 93 on the gears 40 and 42. If desired, energizing springs 94 may be provided adjacent the blocker rings to lightly bias the cone surfaces into engagement so that the teeth of the blocker rings may be misaligned with respect to the sleeve teeth during asynchronous rotation of the shafts 10 and 14 thereby resisting shift of the sleeve 50 into clutching engagement.

The relative movement between the blocker teeth and sleeve teeth is controlled by a circumferential slot or slots 95 on the blocker rings and by clocking means carried by the hub sections which engage in the slots of the blocker rings. The slots 95 are of sufficient length to enable relative clocking movement between the clutch sleeve and the blocker rings such that when the shafts 10 and 14 are rotating asynchronously, the teeth of the blocker rings 53, 56 will respectively be positioned in blocking relationship to the teeth 84 of the clutch sleeve 50 and will resist clutching engagement of the sleeve until approximate synchronous conditions prevail. Thus in Fig. 2, for example, we have provided pin means 96 of which there may be a plurality equally spaced circumferentially of the hub sections. These pins are preferably rigidly mounted in the hub section 62 and have opposite extensions 97 and 98 which project into the circumferential slots of the blocker rings. It will be noted that the extension projects through a clearance opening 99 in the loose hub section 64 which opening will preferably be of sufficient size to permit full relative movement between the hub sections 62, 64 to the extent of the splined connection between this section and the shaft 14. It will be understood that if a sufficient number of pins 96 be employed to carry the torque load transmitted between the shafts 10 and 14 the splined connection between the hub section 64 and shaft 14 could be dispensed with and the hub section 64 made a free member on the shaft 14, relative clocking between the hub sections being then controlled by the pins 96 and openings 99 which would then be a lost motion means.

When the sleeve 50 is moved forwardly, the teeth 84 thereof engage the pointed ends of the blocker teeth 55 thereby urging the blocking ring under pressure into engagement with the cone-shaped clutch surface 93 whereupon the gear 42 is synchronized with the shaft 14 (the main clutch of the vehicle is released during manual shift of the sleeve 50 to facilitate this clutching action). The blocker ring 56 will then rotate slightly relative to the hub section 62 as permitted by the pin 96 in Fig. 2, to permit the sleeve teeth 84 to pass through the blocker teeth 55 and interengage with the clutch teeth 54 of the third speed gear 42 thereby positively clutching the shaft 14 with the drive pinion 42. (See Fig. 9.)

Rearward shift of sleeve 50 to clutch with the teeth 51 of the first speed gear 40 is similarly synchronously effected under control of the synchronizing blocker ring 53, it being noted in this connection that interengagement of the sleeve 50 with the clutch section 62 is maintained during synchronizing of the gear 40 and until after the clutch sleeve passes through the teeth 52 of the blocking ring 53 to engage with the clutch teeth 51 of the gear 40 to establish first speed ratio drive.

Figures 8, 9, 12:
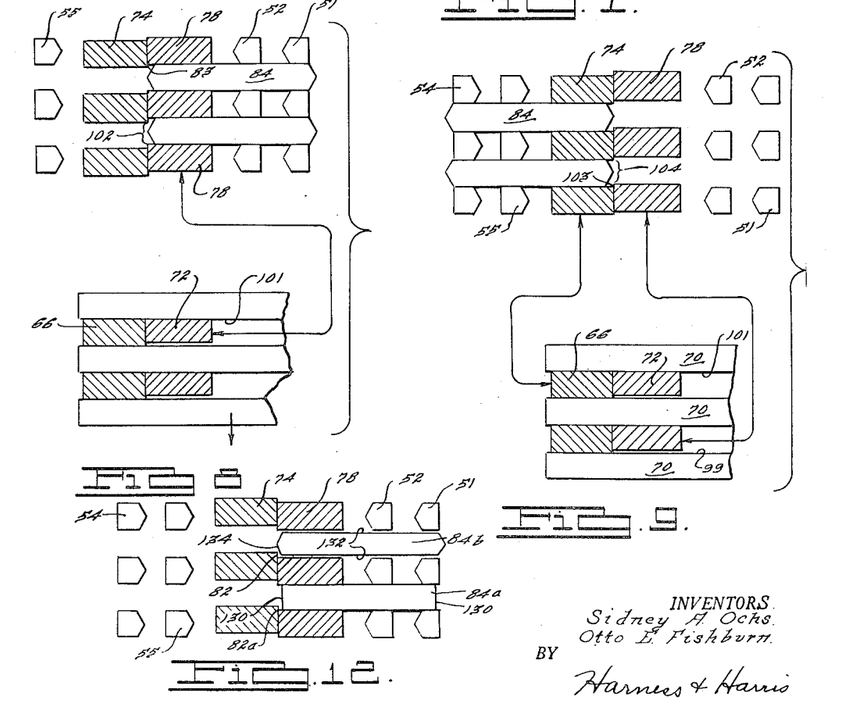
Fig. 8 is a similar view as in Fig. 7 showing the relation of the teeth under coast torque condition.
Fig. 9 is a similar view as in Fig. 7 showing the relationship of the teeth under drive and coast torque conditions in third and fourth speeds forward.
Fig. 12 is a developed view similar to that of Fig. 7 illustrating a modified tooth arrangement.

When the clutch sleeve 50 is shifted forwardly to establish third speed drive in the transmission of Fig. 1 by engaging the clutch sleeve teeth 84 with the clutch teeth 54, the sleeve 50 will assume a position indicated by the dot and dash lines in Fig. 1 and shown more specifically by the position of the teeth 84 in Fig. 9 which position will be just to the left or forwardly of the line of abutment between the external teeth of the hub sections 62 and 64 such that the teeth 78 of the hub section 64 will be disengaged from drive connection with the sleeve. Similarly, when the clutch sleeve 50 is shifted rearwardly into engagement with the clutch teeth 51 of the first speed gear, the clutch teeth 84 of the sleeve will become disengaged from drive connection with the external teeth 74 of the hub section 62 such that the teeth 84 are slightly to the right or rearwardly of the line of abutment between the external teeth of the hub sections 62 and 64.

When the transmission is being driven in first speed, the torque transmitted from the clutch teeth 51 to the hub teeth 78 will cause the hub section 64 to be rotated relative to the fixed hub section 62 to take up the lost motion in the spline connection between the hub section 64 and the shaft 14 such that the hub teeth 72 will contact the side faces 99 of the splines 70 of the shaft 14. Assuming this lost motion to be in the order of 5/1000 of an inch this distance will be multiplied out at the periphery of the hub section 64 in accordance with the ratio of the pitch radius of the external hub teeth to the pitch radius of the shaft splines which in the drawings are approximately 2 to 1, that is, for 5/1000 of an inch circumferential movement of the internal teeth of the hub 64, the external teeth 78 thereof will move circumferentially about 10/1000 of an inch so as to overlap the external teeth 74 of the fixed hub section 62, as shown in the upper half of Fig. 7, this overlap reducing the width of the splineway at the forward end of the hub section 64 and thus providing a stop shoulder 82 or narrow neck 100 for blocking forward movement of the clutch sleeve 50 in the event there should be any tendency for the sleeve 50 to walk out of mesh with respect to the clutch teeth 51 of the first speed gear during torque transmission.

Since the walking out of mesh tendency appears to predominate under coast drive conditions, the subject invention provides for this contingency. Thus Fig. 8 shows that under coast torque conditions the shaft 14 becomes the driver, in which event the faces 101 of the splines 70 become engaged with the adjacent faces of the teeth 72 of the section 64 such that an overlapping relationship occurs between the external hub teeth 74, 78 respectively of the hub sections 62, 64 as shown in Fig. 8 to provide the blocking shoulder 83 and neck 102 to prevent disengagement of the clutch sleeve 50 upon tendency of this member to walk out of mesh under coast torque conditions in first speed ratio drive. It will be observed that the stop shoulder in this instance is just opposite to the stop shoulder providing the blocking action under drive torque conditions.

Figure 7:
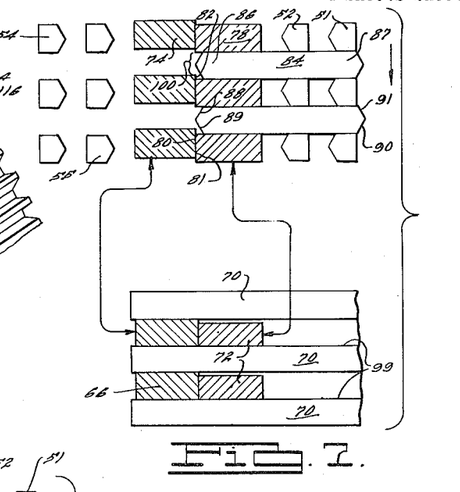
Fig. 7 is a development of the clutch teeth and teeth or tongues of the splined connection of the clutch mechanisms of Figs. 2, 3, and 4 showing the relationship thereof under drive torque conditions in first and second speeds forward.

The relationship of the parts shown in Fig. 7 will also be assumed under drive torque transmission in second speed drive ratio and the relationship of the parts in Fig. 8 will be assumed under coast torque conditions in second speed drive ratio, it being understood that at such time the clutch sleeve 57 is engaged with the clutch teeth 58 of the drive gear 28 such that second speed drive is transmitted from the shaft 10 to the gear 42, gear 38, gear 36, gear 40, sleeve 50, hub section 64, and shaft 14.

When the clutch sleeve 50 is engaged with the clutch teeth 54 to establish third speed ratio drive and the drive is from the engine to the shaft 14 through the clutch teeth 54 the clutch teeth 84 of the shift sleeve 50 will then be engaged with the teeth 74 of the hub section 62 as illustrated in Fig. 9 and drive will be transmitted through this hub section to the shaft 14. In such operation the inertia of the hub section 64 which is then disengaged from the sleeve 50 will cause it to follow instead of lead the hub section 64 such that the external teeth of these hub sections will assume a relationship as shown in Fig. 9, wherein a shoulder 103 and neck 104 is formed by the overlap between the adjacent external teeth of the hub sections to block disengaging movement of the clutch sleeve 50.

Under coast torque conditions the shaft 14 will become the driver instead of the clutch teeth 54 and inertia will again maintain the hub section 64 relatively displaced with respect to the hub section 62, as shown in Fig. 9, the same as under drive torque conditions.

The same relationship will exist under drive torque and coast torque drive conditions when the transmission is established in fourth speed ratio at which time the clutch 57 is engaged with the clutch teeth 58 of the drive gear 28 such that a direct drive is then established in the transmission.

Figures 10, 11:
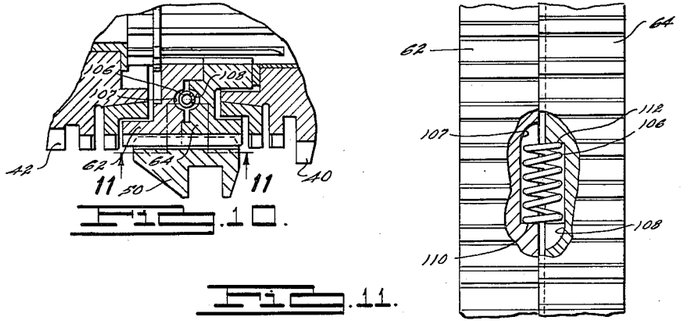
Fig. 10 is a cross-sectional view through the manual selector clutch of Fig. 1 showing such clutch as exemplified in Figs. 2, 3, and 4 provided with resilient means for constantly rotatably biasing a hub section to blocking position.
Fig. 11 is a view taken at 11—11 of Fig. 10, the clutch sleeve being omitted and part of the hub structure being broken away, illustrating the resilient biasing means of Fig. 10.

In some instances it may be desired to avoid reliance on inertia of the hub section 64 to maintain this member displaced relative to the hub section 62 to effect the blocking action in third and fourth speeds (both coast and drive torque conditions) and in such instances provision may be made as in Figs. 10 and 11 for means for constantly, rotatably speaking, biasing the hub section 64 to have the teeth 78 overlap the teeth 74 of the hub section 62. Such a means may be a resilient means such as a plurality of compression springs 106 for example, three equally spaced circumferentially of the hub sections to resiliently effect relative displacement between the two hub sections to the extent permitted by the lost motion in the connection between the hub section 64 and the shaft 14. This is best accomplished as in Fig. 11 by locating the springs 106 in a half recess 107 formed in the hub section 62 and a half recess 108 formed in the hub section 64, the ends of these half recesses overlapping so as to provide lands 110, 112 respectively providing seats for the opposite ends of the springs 32 as before, and thence through the gears 36, 46, 44 to the shaft 14.

As previously stated, under certain drive conditions, depending upon the transmission construction and power transmitted thereby, there is a tendency for the manually shiftable clutch K to become disengaged from its engaged position by "walking out" of mesh. This tendency is more evident during coast drive conditions when the transmission is in a low speed ratio drive. It is an important feature of this invention to prevent the shiftable clutch member from becoming disengaged during the various drive conditions possible except at the will of the operator.

To effect this result the clutch K is, among other things, provided with a split hub construction intermediate the shift member 50 and shaft 14. Thus in Fig. 2, for example, the hub comprises tandem coaxial hub or blocker sections 62 and 64 respectively, intermediate an outer member, as the shift sleeve 50, and an inner member, as the shaft 14, each section preferably having a connection with the shaft 14 as by a splined, i. e., tongue or tooth and groove engagement therewith. The internal splines, tongues, or teeth 66 of the hub section 62 (see Fig. 5) are preferably made to fit the splineways or grooves 68 between the splines, tongues, or teeth 70 of the shaft 14, preferably, without backlash. The internal splines, tongues, or teeth 72 of the section 64 however, are purposely made slightly thinner on each side of their axes than the splines 70 such that the teeth 72 are of less thickness than the width of the splineways 68 of the shaft 14 and thus thinner than the teeth 66 of the hub section 62, by an amount, for example, between $2/1000$ to $10/1000$ of an inch, preferably, about $5/1000$ of an inch, which latter figure has been found to be suitable in actual practice, so as to provide for a limited relative rotational, oscillatory or clocking movement of the hub section 64 with respect to the shaft 14 and consequently, also with respect to the hub section 62 by means of the teeth 72 and splineways 68 which I may for convenience, term a clocking or lost motion means.

The hub section 62 has external clutching teeth or tongues 74 circumferentially spaced by recesses or grooves 76 and the hub section 64 has similar clutching teeth 78 and spaces 79 respectively, that is, similar in size and spacing. The teeth 74 and 78 are preferably aligned axially when the axes of their respective internal teeth are also aligned axially. The ends of the external hub teeth are preferably square with the axis of rotation where the hub sections substantially abut, thus providing the lateral or end faces 80 on the teeth 74 and similar end faces 81 on the teeth 78 which, when the hub sections are at the limit of the relative rotation permitted by the lost motion in the loose splined connection of the hub 64, overlap to provide a blocking means or shoulder, for example, the blocking shoulders 82 in Fig. 7 or the blocking means or shoulders 83 in Fig. 8 dependent upon the transmission setting and drive conditions.

The shift device 50 has internal clutching teeth 84 circumferentially spaced by spaces 85 which teeth are slidably interengageable with the external teeth 74 and 78 of the hub sections and provide a selective connection with these teeth 74 and 78, the teeth 84 being in engagement with both teeth 74 and 78 when the device 50 is, for example, in the neutral position of Figure 1 and being disengaged with respect to the teeth 74 or 78 when the device 50 is in a drive position as hereinafter described. The opposite ends 86, 87 of the teeth 84 are preferably, as shown, chamfered at each side of the tooth axis to provide pointed teeth for facilitating shifting of the sleeve 50. Thus the forward ends 86 of the teeth 84 have the angular faces 88 and 89 and the rear end 87 of these teeth the angular faces 90 and 91. The included angle between these angular faces is preferably in the order of 90° to facilitate easy manual shifting and blocking with respect to shoulders 82 and 83 aforesaid.

The clutch teeth 51, 54 and blocker teeth 52, 55 are similarly pointed and have a circumferential pitch and pitch diameter similar to the teeth of the shift sleeve 50. The blocker rings 53, 56 are also provided with internal cone-shaped threaded surfaces 92 which are adapted to frictionally engage complementary cone-shaped clutch surfaces 93 on the gears 40 and 42. If desired, energizing springs 94 may be provided adjacent the blocker rings to lightly bias the cone surfaces into engagement so that the teeth of the blocker rings may be misaligned with respect to the sleeve teeth during asynchronous rotation of the shafts 10 and 14 thereby resisting shift of the sleeve 50 into clutching engagement.

The relative movement between the blocker teeth and sleeve teeth is controlled by a circumferential slot or slots 95 on the blocker rings and by clocking means carried by the hub sections which engage in the slots of the blocker rings. The slots 95 are of sufficient length to enable relative clocking movement between the clutch sleeve and the blocker rings such that when the shafts 10 and 14 are rotating asynchronously, the teeth of the blocker rings 53, 56 will respectively be positioned in blocking relationship to the teeth 84 of the clutch sleeve 50 and will resist clutching engagement of the sleeve until approximate synchronous conditions prevail. Thus in Fig. 2, for example, we have provided pin means 96 of which there may be a plurality equally spaced circumferentially of the hub sections. These pins are preferably rigidly mounted in the hub section 62 and have opposite extensions 97 and 98 which project into the circumferential slots of the blocker rings. It will be noted that the extension projects through a clearance opening 99 in the loose hub section 64 which opening will preferably be of sufficient size to permit full relative movement between the hub sections 62, 64 to the extent of the splined connection between this section and the shaft 14. It will be understood that if a sufficient number of pins 96 be employed to carry the torque load transmitted between the shafts 10 and 14 the splined connection between the hub section 64 and shaft 14 could be dispensed with and the hub section 64 made a free member on the shaft 14, relative clocking between the hub sections being then controlled by the pins 96 and openings 99 which would then be a lost motion means.

When the sleeve 50 is moved forwardly, the teeth 84 thereof engage the pointed ends of the blocker teeth 55 thereby urging the blocking ring under pressure into engagement with the cone-shaped clutch surface 93 whereupon the gear 42 is synchronized with the shaft 14 (the main clutch of the vehicle is released during manual shift of the sleeve 50 to facilitate this clutching action). The blocker ring 56 will then rotate slightly relative to the hub section 62 as permitted by the pin 96 in Fig. 2, to permit the sleeve teeth 84 to pass through the blocker teeth 55 and interengage with the clutch teeth 54 of the third speed gear 42 thereby positively clutching the shaft 14 with the drive pinion 42. (See Fig. 9.)

Rearward shift of sleeve 50 to clutch with the teeth 51 of the first speed gear 40 is similarly synchronously effected under control of the synchronizing blocker ring 53, it being noted in this connection that interengagement of the sleeve 50 with the clutch section 62 is maintained during synchronizing of the gear 40 and until after the clutch sleeve passes through the teeth 52 of the blocking ring 53 to engage with the clutch teeth 51 of the gear 40 to establish first speed ratio drive.

When the clutch sleeve 50 is shifted forwardly to establish third speed drive in the transmission of Fig. 1 by engaging the clutch sleeve teeth 84 with the clutch teeth 54, the sleeve 50 will assume a position indicated by the dot and dash lines in Fig. 1 and shown more specifically by the position of the teeth 84 in Fig. 9 which position will be just to the left or forwardly of the line of abutment between the external teeth of the hub sections 62 and 64 such that the teeth 78 of the hub section 64 will be disengaged from drive connection with the sleeve. Similarly, when the clutch sleeve 50 is shifted rearwardly into engagement with the clutch teeth 51 of the first speed gear, the clutch teeth 84 of the sleeve will become disengaged from drive connection with the external teeth 74 of the hub section 62 such that the teeth 84 are slightly to the right or rearwardly of the line of abutment between the external teeth of the hub sections 62 and 64.

When the transmission is being driven in first speed, the torque transmitted from the clutch teeth 51 to the hub teeth 78 will cause the hub section 64 to be rotated relative to the fixed hub section 62 to take up the lost motion in the spline connection between the hub section 64 and the shaft 14 such that the hub teeth 72 will contact the side faces 99 of the splines 70 of the shaft 14. Assuming this lost motion to be in the order of 5/1000 of an inch this distance will be multiplied out at the periphery of the hub section 64 in accordance with the ratio of the pitch radius of the external hub teeth to the pitch radius of the shaft splines which in the drawings are approximately 2 to 1, that is, for 5/1000 of an inch circumferential movement of the internal teeth of the hub 64, the external teeth 78 thereof will move circumferentially about 10/1000 of an inch so as to overlap the external teeth 74 of the fixed hub section 62, as shown in the upper half of Fig. 7, this overlap reducing the width of the splineway at the forward end of the hub section 64 and thus providing a stop shoulder 82 or narrow neck 100 for blocking forward movement of the clutch sleeve 50 in the event there should be any tendency for the sleeve 50 to walk out of mesh with respect to the clutch teeth 51 of the first speed gear during torque transmission.

Since the walking out of mesh tendency appears to predominate under coast drive conditions, the subject invention provides for this contingency. Thus Fig. 8 shows that under coast torque conditions the shaft 14 becomes the driver, in which event the faces 101 of the splines 70 become engaged with the adjacent faces of the teeth 72 of the section 64 such that an overlapping relationship occurs between the external hub teeth 74, 78 respectively of the hub sections 62, 64 as shown in Fig. 8 to provide the blocking shoulder 83 and neck 102 to prevent disengagement of the clutch sleeve 50 upon tendency of this member to walk out of mesh under coast torque conditions in first speed ratio drive. It will be observed that the stop shoulder in this instance is just opposite to the stop shoulder providing the blocking action under drive torque conditions.

The relationship of the parts shown in Fig. 7 will also be assumed under drive torque transmission in second speed drive ratio and the relationship of the parts in Fig. 8 will be assumed under coast torque conditions in second speed drive ratio, it being understood that at such time the clutch sleeve 57 is engaged with the clutch teeth 58 of the drive gear 28 such that second speed drive is transmitted from the shaft 10 to the gear 42, gear 38, gear 36, gear 40, sleeve 50, hub section 64, and shaft 14.

When the clutch sleeve 50 is engaged with the clutch teeth 54 to establish third speed ratio drive and the drive is from the engine to the shaft 14 through the clutch teeth 54 the clutch teeth 84 of the shift sleeve 50 will then be engaged with the teeth 74 of the hub section 62 as illustrated in Fig. 9 and drive will be transmitted through this hub section to the shaft 14. In such operation the inertia of the hub section 64 which is then disengaged from the sleeve 50 will cause it to follow instead of lead the hub section 64 such that the external teeth of these hub sections will assume a relationship as shown in Fig. 9, wherein a shoulder 103 and neck 104 is formed by the overlap between the adjacent external teeth of the hub sections to block disengaging movement of the clutch sleeve 50.

Under coast torque conditions the shaft 14 will become the driver instead of the clutch teeth 54 and inertia will again maintain the hub section 64 relatively displaced with respect to the hub section 62, as shown in Fig. 9, the same as under drive torque conditions.

The same relationship will exist under drive torque and coast torque drive conditions when the transmission is established in fourth speed ratio at which time the clutch 57 is engaged with the clutch teeth 58 of the drive gear 28 such that a direct drive is then established in the transmission.

In some instances it may be desired to avoid reliance on inertia of the hub section 64 to maintain this member displaced relative to the hub section 62 to effect the blocking action in third and fourth speeds (both coast and drive torque conditions) and in such instances provision may be made as in Figs. 10 and 11 for means for constantly, rotatably speaking, biasing the hub section 64 to have the teeth 78 overlap the teeth 74 of the hub section 62. Such a means may be a resilient means such as a plurality of compression springs 106 for example, three equally spaced circumferentially of the hub sections to resiliently effect relative displacement between the two hub sections to the extent permitted by the lost motion in the connection between the hub section 64 and the shaft 14. This is best accomplished as in Fig. 11 by locating the springs 106 in a half recess 107 formed in the hub section 62 and a half recess 108 formed in the hub section 64, the ends of these half recesses overlapping so as to provide lands 110, 112 respectively providing seats for the opposite ends of the springs 106, the latter resiliently displacing the hub section 62, 64 to the relationship shown in Fig. 9. In other words, the springs 106 effect a positive or constant bias between the two hub sections to displace the teeth of one with respect to the teeth of the other and thus block rearward movement of the clutch sleeve 50. A similar result will follow under coast torque conditions in first and second speeds described above, for as seen from Fig. 8 the external teeth of the hub sections 62, 64 will be in the same relationship as in Fig. 9. Under drive torque operation in first and second speed ratio drive, the hub section 62 will effect a compression of the springs 106 in taking up the lost motion between the internal teeth of this section and the shaft 14 to assume the position shown in Fig. 7.

It will be understood that other resilient means, for example, a torsion spring may be connected between the two hub sections to provide the result previously described with respect to the springs 106. Moreover, that the spring bias may be reversed when the normal direction of rotation of the parts are opposite to that assumed or should the conditions where blocking of a movable element so warrant.

Figure 6:
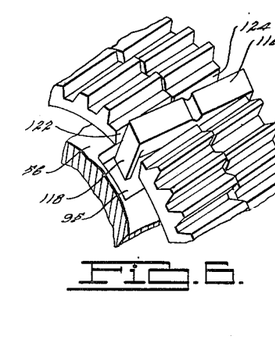
Fig. 6 is an enlarged view in perspective of a peripheral portion of the hub structure of the clutch mechanism of Fig. 3 showing the hub sections with their teeth misaligned for effecting blocking of the shiftable member of Fig. 3.

The operation of the clutch structures shown in Figs. 3 and 4 are similar to that described with respect to the structure of Fig. 2 insofar as the feature of blocking shift of the shift sleeve 50 out of engagement is concerned. The distinctions are primarily concerned with the clocking control for the blocker rings 53, 56. Thus in Fig. 3 the clocking pins 96 of the Fig. 2 structure are omitted and clocking between the blocker rings 53, 56 and fixed hub member is provided by means of struts 116, three of which are preferably provided spaced 120° apart. These struts have radially directed lips 118 at their opposite ends which are disposed in the slots 95 of the blocker rings 53 and 56. The struts are maintained in position by means of C springs 120. The hub section 62ª has a slot 122 which is a substantial fit with the strut 116 whereas the hub section 64ª has a slot 124 which is of sufficient width to accommodate the permissible lost motion between two hub sections described above. It will be understood, however, that the slots 122 may be made somewhat loose with respect to the strut 116 such that the clocking action between the hub sections may be possible by a rocking movement of the struts, as shown in Fig. 6. In that event the slots 122 and 124 need not be of different size. It will also be observed that in operation of the clutch structure of Fig. 3 forward or rearward movement of the sleeve 50, as the case may be, will carry with it the strut 116 which will engage the blocker ring in its path energizing the same for movement to blocking position.

With regard to the clutch structure in Fig. 4, it will be apparent that here the fixed hub 62ᵈ and the loose hub 64ᵈ each have integral tongues 126 engaging in the slots 95 of the blocking or synchronizing rings to determine the relative clocking between the synchronizing ring and the hub structure. Moreover, energizing springs 128 are provided for energizing the synchronizing rings 53 and 56 respectively. Thus the blocking or synchronizing rings are served by independent clocking control members in this arrangement. It will be observed that the clocking between the hub section 64ᵈ and the blocking ring 53 does not interfere with the clocking of the hub section relative to the shaft 14 since any relative movement under drive and coast torque conditions will occur with the shift sleeve 50 engaged with only one of the hub sections.

Fig. 12 discloses a portion of the developed structure of Fig. 7 wherein the shape of the sleeve 50, teeth 84 are slightly modified to provide a two-step blocking arrangement that includes a positive blocking shoulder for blocking any tendency for the sleeve to become disengaged should the blocking means of Fig. 7 for any reason fail. For this purpose certain teeth 84ª on the shift member 50 are formed with square ends providing end faces 130 and other teeth 84ᵇ are formed similar to those of Fig. 7 but with its side faces 132 thinned down an amount less than the permissible relative rotation between the hub sections. Thus as seen in Fig. 12 the chamfered face 134 of the tooth 84ᵇ will block forward movement of the shift sleeve by encountering the shoulder 82 formed between the teeth 74 and 78. Should for any reason the face 134 pass the shoulder 82 then the face 130 of the next tooth will abut a similar shoulder 82ª between two other hub teeth, it being noted that the face 130 of the tooth 84ª is set back from the face 134 of the tooth 84ᵇ. This abutment will occur before the teeth 84ª and 84ᵇ become disengaged from the clutch teeth 51. The set back of the face 130 is sufficient so as not to interfere with the synchronizing function of the faces 134 on forward movement of the shift sleeve to encounter the teeth 55 of the synchronizing ring.

Figures 13, 14, 15, 16, 17:
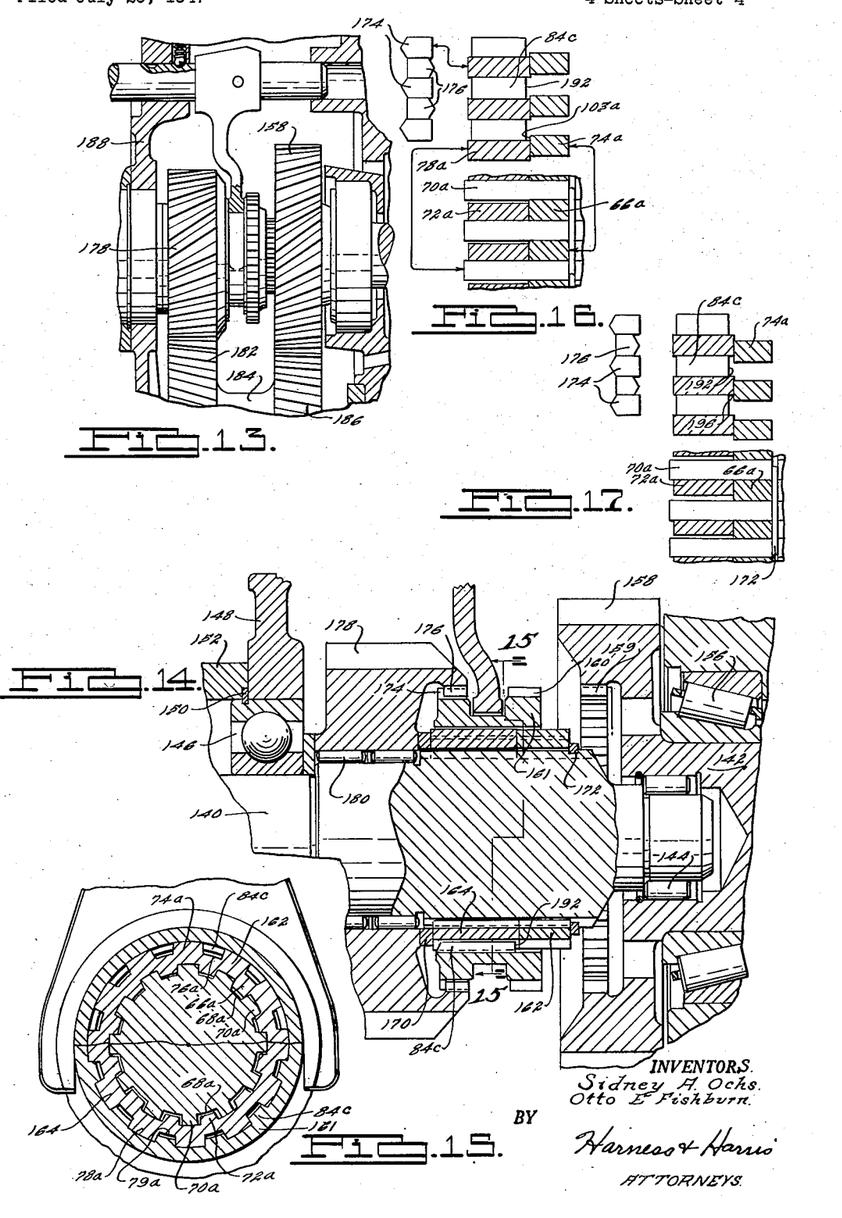
Fig. 13 is a view of a portion of a conventional gear transfer box of an automotive truck embodying our invention.
Fig. 14 is an enlarged cross-sectional view of the clutch structure of Fig. 13.
Fig. 15 is a cross-sectional view taken at 15—15 of Fig. 14.
Fig. 16 is a development of the clutch teeth and spline teeth of the mechanism of Fig. 15 under drive torque conditions in low.
Fig. 17 is a similar development under coast torque conditions.

Figs. 13 to 15 inclusive disclose a transfer box construction embodying our invention. As seen in these figures, the conventional transfer unit comprises a driving or input shaft 140 adapted to receive power from the gear transmission through a propeller shaft (not shown) connected by means of a universal coupling (also not shown) splined to the shaft 140. One end of the shaft 140 is piloted in the end of a first output shaft 142 on needle bearings 144 and the opposite end is carried in a ball bearing 146 mounted in the casing 148 of the transfer box and retained therein by a retaining ring 150 and an adaptor 152 suitably secured to the casing 148. The shaft 142 is journalled in roller bearings 156, one of which is shown. Integral with the shaft 142 is a high speed gear 158 having on its inner end a set of internal clutch teeth 159 adapted to be engaged by a mating set of external clutch teeth 160 on an axially shiftable clutch sleeve 161 telescoped with and splined to a split hub comprising a hub section 162 fixedly splined with respect to the shaft 140 and another hub section 164 loosely splined with respect to the shaft 140, these hub sections being maintained in position on the shaft 140 between the collar 170 and split ring 172.

The shiftable clutch sleeve 161 also includes a second set of external clutch teeth 174 which are shown in Fig. 14 engaged with a mating set of internal clutch teeth 176 on an input gear 178 journalled on needle bearings 180 carried on the shaft 140 so as to be freely rotatable relative to and on the shaft 140. As seen in Fig. 13, the input gear 178 meshes with a gear 182 of an idler gear cluster 184 which includes a second gear 186 that in turn meshes with the output shaft gear 158. The cluster gear 184 is suitably mounted in a casing 188 and the gear 186 meshes with a further pinion connected to a second output shaft (not shown) in a manner shown and described in the copending application of Albert E. Kimberly, Serial No. 530,602, filed April 12, 1944, issued into Patent No. 2,450,896 on October 12, 1948.

As in the case of the split hub construction in Fig. 2, the teeth or tongues 84ᶜ of the shift sleeve 161 are a sliding fit in the grooves or recesses 76ᵃ between the teeth 74 of the hub section 162 and in the grooves or recesses 79ᵃ between the teeth 78ᵃ of the hub section 164. Moreover, the internal teeth or tongues 66ᵃ are a fit in the grooves 68ᵃ between the tongues or splines 70ᵃ of the shaft 140 while the internal teeth or tongues 72ᵃ of the hub section 164 are loose in the grooves 68ᵃ of the shaft 140 to permit the relative rotation or lost motion between this loose hub section and the shaft and other hub section described above with respect to the construction of Fig. 2, for example.

In operation of the transfer case clutch mechanism, the clutch sleeve 161 is shiftable by means (not shown) under control of the driver to any one of three positions: a neutral position wherein the clutch sleeve is disengaged from the clutch teeth 176 and clutch teeth 159; a second position where it is clutched as shown in Fig. 14 with the input gear 178 to obtain low speed drive, and a third position where it is engaged with the clutch teeth 159 of the gear 158 to establish high speed drive. It will be understood that when low speed is established, drive is transmitted from the input shaft 140 through the loose hub section 164 to the shiftable clutch member 161 thence through the clutch teeth 174, 176 to the gear 178 and through the idler cluster 184 to the high speed gear 158 which drives the output shaft 142. The gear 158 being larger than the gear 178 and the idler gear 186 being smaller than the idler gear 182, a reduction drive is obtained between the shafts 140 and 142 when the clutch teeth 174, 176 as previously stated, are engaged for low speed drive. High speed is established by shifting the shiftable clutch member 161 to engage the clutch teeth 159, 160 in drive, power being then transmitted directly from the input shaft 140 to the output shaft 142 through the hub sections 162, 164 to the shiftable sleeve 161 and the clutch teeth 159, 160.

In order to prevent walking out of mesh of the clutch sleeve 161 during transmission of torque in low speed ratio drive, the internal teeth 84ᶜ of the shift sleeve 161 are set back from the rearward end of the sleeve 161 to provide a shoulder or end face 192 (Figs. 14, 17) which in the low speed engaged position of the sleeve 161 is just forward of the line of abutment between the adjacent hub sections 162, 164. Fig. 16 shows the relationship of the various teeth in low speed drive under coast torque conditions. Thus the gear 178 will be the driver and the loose hub section 164 being driven through the sleeve 161 will take up the lost motion in its splined connection with the shaft 140 and assume a position of overlap with respect to the hub section 162, that is the teeth 78ᵃ of the loose hub section 164 will overlap the teeth 74ᵃ of the hub section 162 as shown in Fig. 16, to provide a shoulder 103ᵃ for blocking rearward movement of the sleeve 161, the said shoulder acting as an abutment for the face 192 of the teeth 84ᶜ of the shift sleeve 161.

Under drive torque conditions in low speed drive ratio, the shaft 140 will be the driver and hence the opposite faces of the internal teeth 72ᵃ of the hub section 164 will become engaged with the teeth 70ᵃ of the shaft 140 as shown in Fig. 17 again producing an overlap between the teeth of the hub sections 162, 164 and providing a shoulder 196 for engaging with the teeth 84ᶜ of the sleeve 161 upon any tendency of the clutch sleeve to become disengaged.

It will be understood that if desired, spring means may be provided as in the case of the clutch structures previously described and more specifically shown in Figs. 10 and 11 to obtain a positive relative rotation between the hub sections 162, 164.

From the above description it will be seen that we have provided novel means for blocking shifting movement of the shiftable clutch device of clutch structures both of the synchromesh and blocker types and manual positive clutching type and that while the particular structures herein described are well adapted for carrying out the various objects of our invention, it will be understood that various modifications, changes, and substitutions may be made without departing from the spirit thereof. It will also be understood that the various features described above may be used alone or in combination or may be combined in ways other than those shown also without departing from the present teachings. The subject invention is therefore, to be construed to include all such modifications, changes, and substitutions as may come within the scope of the following claims.

We claim:

1. In a transmission clutch the combination of an inner member, an outer member, a first intermediate section non-rotatably carried by said inner member and connected through interlocking tongues and grooves with said outer member, and a second intermediate section having a lost motion connection with one of said sections and said inner member permitting a small amount of relative rotation between said sections and connectible through interlocking tongues and grooves with said outer member; said outer member being shiftable to a position of connection with said second section and disconnected from said first section whereby a driving relationship is established between said members through said second section; the tongues of said outer member when in said driving relationship being adapted to become rotatably overlapping relative to the tongues of said first section upon torque being applied through said second section to take up said relative rotation whereby the said overlapped portions of said tongues of said first section serve to block disengaging movement of said outer member relative to said second section.

2. In a transmission clutch the combination of an inner member, an outer shiftable member, a first intermediate section, and a second intermediate section, said members and sections having interlocking tongue and groove connections whereby the members and sections rotate as a unit about a common axis, there being substantial backlash in the tongue and groove connection between said second section and said inner member but less than the width of a tongue whereby the tongues of one section may be positioned in blocking relation to the tongues of said shiftable member when the latter is in a shifted position disengaged from said one section and torque is being applied between said members through the other of said sections.

3. In a transmission clutch, the combination of an inner member, an outer member, a first intermediate section and a second intermediate section, said sections having alignable external tongues respectively interengageable with tongues on said outer member and having internal tongues respectively interengaged with tongues on said inner member whereby the members and sections are rotatable as a unit about a common axis, said outer member being shiftable to selective positions engaged with one or the other of said sections and the internal tongues of one of said sections being of less thickness than those of said inner member interengaged therewith to permit a limited oscillatory movement between said one section and inner member whereby the external tongues of said sections become misaligned to block axial movement of said outer member from a shifted position when torque is being applied from one member to the other.

4. In a transmission change speed mechanism for a motor vehicle having an engine and vehicle driving wheel means, a toothed clutch member adapted to be drivingly connected to one of said engine and wheel means, a power transmitting member adapted to be drivingly connected to the other of said engine and wheel means, an intermediate drive transmitting member having internal tongues interengaged with tongues on said power transmitting member and having external tongues, a shiftable clutching member having tongues interengageable with the external tongues of said intermediate member and shiftable into engagement with said toothed clutch member to establish a driving relationship between said engine and vehicle driving wheels, a second intermediate member non-rotatably carried by said power transmitting member and having tongues alignable with the external tongues of said first mentioned intermediate member, the said internal tongues being of less thickness than the tongues of the said power transmitting member to permit a limited oscillatory movement between these members and between said intermediate members whereby when said shiftable member is engaged with said toothed clutch member and torque is being transmitted between said toothed clutch member and said power transmitting member said alignable teeth of said intermediate members will be misaligned to block disengaging movement of said shiftable member.

5. In a power transmitting mechanism two rotatable parts each having a set of clutch teeth; a third part adapted for selective drive relation with said two parts; a bipartite hub structure carried by said third part intermediate said two parts and comprising juxtaposed sections; a shift device having drive connection with said hub structure and having clutch teeth adapted for selective positioning in clutching engagement with the clutch teeth of said two rotatable parts, said shift device being disconnected from one of said sections when in clutching engagement with one of said two rotatable parts; said hub sections having external tongues adapted to be aligned when said shift device is shifted between its positions of clutching engagement and one of said hub sections having a splined lost motion connection with said third part to provide a predetermined oscillatory movement between this one section and said third part whereby the said alignable teeth of said hub sections may become misaligned when said shift device is in clutching engagement with the said one of said two rotatable parts for transmission of torque through said mechanism.

6. In a power transmitting mechanism two spaced rotatable parts each having a set of clutch teeth; a third rotatable part co-axial with said two parts; a bipartite hub structure carried by said third part intermediate said two parts and comprising juxtaposed tandem sections; a shift device having drive connection with said hub structure and having clutch teeth adapted for selective positioning in clutching engagement with the clutch teeth of said two rotatable parts, said shift device being directly drivingly connected to only one of said hub sections when in clutching engagement with either of said two rotatable parts; the said hub sections having external tongues adapted to be aligned to facilitate shift of said shiftable device between its said clutching positions, and one of said hub sections having a lost motion connection with said third part providing a limited predetermined relative rotational movement between this one section and said third part whereby said alignable teeth of said hub sections may be misaligned when said shift device is in either clutched position and undergoing torque transmission to prevent disengaging shift of said shift device.

7. In a power transmitting mechanism a pair of spaced power transmitting members each having a set of clutch teeth; a power transmitting shaft coaxial with said members having radial tongues and grooves; a hub structure carried by said shaft and comprising juxtaposed tandem sections each having internal and external radial tongues and grooves, the internal tongues and grooves being interengaged with the tongues and grooves of said shaft and the external tongues being alignable axially; a shift device having internal tongues and grooves interengageable with said external tongues and grooves of said hub sections and being selectively shiftable axially into clutching engagement with said members and when so engaged being interengaged with only one of said sections; the internal tongues of one of said sections being of less thickness than the width of the grooves of said shaft in which they are engaged to provide for a limited oscillatory movement between this section and said shaft whereby the tongues of said sections may be misaligned when the shift device is engaged with one of said members and undergoing transmission of torque.

8. In a transmission clutch mechanism the combination comprising a shiftable toothed clutching member, a toothed drive transmitting member adapted for clutching engagement with said shiftable member, a supporting member for supporting said shiftable member when engaged with said drive transmitting member, a toothed blocker member for blocking disengaging shift of said shiftable member, and spring means operable between said blocker member and supporting member for rotatably disposing said blocker member in blocking relation to said shiftable member.

9. In a transmission clutch mechanism the combination comprising a shiftable toothed clutching member, a toothed drive transmitting member adapted for clutching engagement with said shiftable member, a supporting member for supporting said shiftable member when engaged with said drive transmitting member, a toothed blocker member rotatable relative to said shiftable member for blocking disengaging shift of said shiftable member, spring means operable between said blocker member and supporting member for rotatably disposing said blocker member in blocking position and means for limiting said relative rotation.

10. In a transmission clutch, the combination of an inner member, an outer shiftable member, an intermediate section having a set of external tongues interengageable with tongues on said shiftable member and having internal tongues interengageable with tongues on said inner member whereby said section and shiftable member are rotatable with said inner member about a common axis, said inner member having further means rotatable therewith including a second set of external tongues alignable with the external tongues of said intermediate section and interengageable with the tongues of the shiftable member upon shift of said shitfable member into engagement therewith; there being predetermined clearance less than the width of a tongue in the tongue engagement between the internal tongues of said intermediate section and the tongues of said inner member to provide for limited relative rotation between said section and said inner member and between said sets of external teeth whereby the tongues of said sets may be misaligned relative to each other to block axial movement of said shiftable member from a position of interengagement with the external tongues of said intermediate section and disengaged from said second set of tongues when torque is being applied from one member to the other.

11. In a power transmission clutch mechanism the combination comprising a rotatable toothed drive transmitting member, another rotatable toothed drive transmitting member adapted to be drivingly connected with said first mentioned member, a pair of toothed sections rotatable about a common axis and having a position relative to one of said members when said members are drivingly disconnected wherein their teeth are engaged with the teeth of this one member, said sections and this one member being mounted for relative shifting and being relatively shiftable to another position to disengage the teeth of one of said sections and this one member while retaining engagement between the teeth of the other section and this one member, and as an incident thereto to effect engagement between the teeth of the other of said members and the teeth of one of said relatively shiftable sections and member whereby to establish said driving connection between said members, and lost motion connection means operably connecting said sections to provide for limited relative oscillatory motion between said sections, said means accommodating positioning of said disengaged section in blocking relationship to said one member to block disestablishment of said driving connection when said sections and said one member are relatively shifted as aforesaid and said members are undergoing drive transmission.

12. A power transmission clutch mechanism comprising in combination a first rotatable toothed drive transmitting member, a pair of toothed sections rotatable about a common axis, a shiftable toothed drive transmitting member mounted for toothed engagement with said toothed sections and for selective shifting into toothed engagement and disengagement with said first member for establishing and disestablishing driving therebetween, said shiftable member when disengaged from said first member having a position providing toothed engagement with said pair of sections and when in position engaged with said first member being in toothed engagement with one of said pair of sections and in toothed disengagement with the other of said sections, and lost motion connection means in part carried by one of said sections operable to provide limited relative oscillatory motion between said sections, said means accommodating positioning of the said other section in blocking relation to said shiftable member to block disengaging shift of said shiftable member when the latter is engaged as aforesaid with said first member and one section and undergoing drive transmission, and said sections are substantially at the limit of their said relative oscillatory motion.

13. A power transmission clutch mechanism comprising in combination a rotatable toothed drive transmitting member, another rotatable toothed drive transmitting member adapted to be drivingly connected with said first mentioned member, a pair of toothed sections rotatable about a common axis and having a position relative to one of said members when said members are drivingly disconnected wherein their teeth are engaged with the teeth of this one member, said sections and this one member being mounted for relative shifting and being relatively shiftable to another position to disengage the teeth of one of said sections and this one member while retaining engagement between the teeth of the other section and this one member, and as an incident thereto to effect engagement between the teeth of the other of said members and the teeth of one of said relatively shiftable sections and member whereby to establish said driving connection between said members, and lost motion connection means operably interconnecting said sections to provide for limited oscillatory motion between said sections, said means accommodating positioning of said disengaged section in blocking relationship to said one member to block disestablishment of said driving connection when said sections and said one member are relatively shifted as aforesaid and said members are undergoing drive transmission.

14. A power transmission clutch mechanism comprising in combination a rotatable toothed drive transmitting member, another rotatable toothed drive transmitting member adapted to be drivingly connected with said first mentioned member, a pair of toothed sections rotatable about a common axis and having a position relative to one of said members when said members are drivingly disconnected wherein their teeth are engaged with the teeth of this one member, said sections and this one member being mounted for relative shifting and being relatively shiftable to another position to disengage the teeth of one of said sections and this one member while retaining engagement between the teeth of the other section and this one member, and as an incident thereto to effect engagement between the teeth of the other of said members and the teeth of one of said relatively shiftable sections and member whereby to establish said driving connection between said members, lost motion connection means operably connecting said sections to provide for limited relative oscillatory motion between said sections, and resilient means for biasing said sections to the limit of their relative oscillatory motion, said lost motion connection means accommodating positioning of said disengaged section in blocking relationship to said one member to block disestablishment of said driving connection when said sections and said one member are relatively shifted as aforesaid, and said sections are substantially at the limit of their said relative oscillatory motion.

15. A power transmission clutch mechanism comprising in combination a rotatable toothed drive transmitting member, another rotatable toothed drive transmitting member adapted to be drivingly connected with said first mentioned member, a pair of toothed sections rotatable about a common axis and having a position relative to one of said members when said members are drivingly disconnected wherein their teeth are engaged with the teeth of this one member, said sections and this one member being mounted for relative shifting and being relatively shiftable to another position to disengage the teeth of one of said sections and this one member while retaining engagement between the teeth of the other section and this one member, and as an incident thereto to effect engagement between the teeth of the other of said members and the teeth of one of said relatively shiftable sections and member whereby to establish said driving connection between said members, lost motion connection means operably connecting said sections to provide for limited relative oscillatory motion between said sections, and spring means interposed between said sections for biasing said sections to the limit of their relative oscillatory motion, said lost motion connection means accommodating positioning of said disengaged section in blocking relationship to said one member to block disestablishment of said driving connection when said sections and said one member are relatively shifted as aforesaid, and said sections are substantially at the limit of their said relative oscillatory motion.

16. A power transmission clutch mechanism comprising in combination a first rotatable toothed drive transmitting member, a pair of toothed sections, means supporting said sections for rotation about a common axis, one of said sections being directly rotatable with said supporting means and the other including means providing a lost motion driving connection with said supporting means, a shiftable toothed drive transmitting member mounted for toothed engagement with said toothed sections and for selective shifting into toothed engagement and disengagement with said first member for establishing and disestablishing drive therebetween, said shiftable member when disengaged from said first member having a position providing toothed engagement with said pair of sections and when in position engaged with said first member being in toothed engagement with one of said pair of sections and in toothed disengagement with the other of said sections, said lost motion connection providing for relative oscillatory motion between said sections and accommodating positioning of the said other section in blocking relation to said shiftable member to block disengaging shift of said shiftable member when the latter is engaged as aforesaid with said first member and one section and undergoing drive transmission and said sections are substantially at the limit of their said relative oscillatory motion.

17. A power transmission clutch mechanism comprising a first rotatable toothed power transmitting member, a second rotatable toothed power transmitting member, a first rotatable toothed blocker section, a second rotatable toothed blocker section coaxial with and in juxtaposition to said first section, a shiftable toothed power transmitting member mounted for toothed engagement with said sections and selectively shiftable into toothed engagement and disengagement with said first and second toothed power transmitting members for establishing and disestablishing drive with these members, said shiftable member when in toothed engagement with said first member being in toothed engagement with said first section and in toothed disengagement with said second section and when in toothed engagement with said second member being in toothed engagement with said second section and in toothed disengagement with said first section, and lost motion means operably connecting said sections to provide limited relative oscillatory motion between said sections, said lost motion means accommodating positioning of said first blocker section in blocking relation to said shiftable member to block disengaging shift of said shiftable member when the latter is engaged as aforesaid with said second member and with said second section and undergoing power transmission and accommodating positioning of said second blocker section in blocking relation to said shiftable member to block disengaging shift of said shiftable member when the latter is engaged as aforesaid with said first member and with said first section and undergoing power transmission.

18. In a power transmission clutch mechanism the combination comprising an inner member, an outer member, a pair of juxtaposed sections, said members and sections being coaxially arranged and supported for rotation, one of said sections being nonrotatably carried relative to one of said members, lost motion means connecting the other of said sections and one of said one member and one section to provide limited oscillatory motion between said sections and between said other section and said one member, said sections and the other member of said inner and outer members being mounted for relative shifting axially between selected positions corresponding to a neutral position and a drive establishing position and having connection means directly connecting both said sections and said other member in said neutral position and directly connecting said other section and said other member while disconnecting the direct connection between said one section and said other member when in said drive position, and said one section including means for blocking relative shifting from said drive position to said neutral position when there is drive between said members.

19. In a power transmission clutch mechanism the combination comprising an inner member, an outer member, a first intermediate section and a second intermediate section, said members and sections being coaxially arranged and supported for rotation and said first section being substantially nonrotatably carried relative to one of said members, lost motion means operable between said second section and said one member for providing said second section with limited rotation relative to said first section, said sections and the other member of said inner and outer members being mounted for relative shifting axially between selected positions corresponding to a neutral position and a drive establishing position and having connection means directly connecting both said sections and said other member in said neutral position, and directly connecting said second section and said other member while disconnecting the direct connection between said first section and said other member when in said drive position, and said first section including means for blocking said relative shifting from said drive position to said neutral position when there is drive between said members.

20. In a power transmission clutch mechanism the combination comprising an inner member, an outer member, a first intermediate section and a second intermediate section, said members and sections being coaxially arranged and supported for rotation and said first section being substantially nonrotatably carried relative to one of said members, lost motion means interconnecting said first and said second sections for providing said second section with limited rotation relative to said first section, said sections and the other member of said inner and outer members being mounted for relative shifting axially between selected positions corresponding to a neutral position and a drive establishing position and having connection means directly connecting both said sections and said other member in said neutral position, and directly connecting said second section and said other member while disconnecting the direct connection between said first section and said other member when in said drive position, and said first section including means for blocking said relative shifting from said drive position to said neutral position when there is drive between said members.

21. A power transmission clutch mechanism comprising in combination a first rotatable toothed drive transmitting member, a pair of toothed sections rotatable about a common axis, a shiftable toothed drive transmitting member mounted for toothed engagement with said toothed sections and for selective shifting into toothed engagement and disengagement with said first member for establishing and disestablishing drive therebetween, said shiftable member when disengaged from said first member having a position providing toothed engagement with said pair of sections and when in position engaged with said first member being in toothed engagement with one of said pair of sections and in toothed disengagement with the other of said sections, and lost motion means comprising a lateral projection on one section interengaged with a slot in the other section and operable to provide limited relative oscillatory motion between said sections, said means accommodating positioning of the said other section in blocking relation to said shiftable member to block disengaging shift of said shiftable member when the latter is engaged as aforesaid with said first member and one section and undergoing drive transmission.

22. A power transmission clutch mechanism comprising in combination a first rotatable toothed drive transmitting member, a pair of toothed sections rotatable about a common axis, a shiftable toothed drive transmitting member mounted for toothed engagement with said toothed sections and for selective shifting into toothed engagement and disengagement with said first member for establishing and disestablishing drive therebetween, said shiftable member when disengaged from said first member having a position providing toothed engagement with said pair of sections and when in position engaged with said first member being in toothed engagement with one of said pair of sections and in toothed disengagement with the other of said sections, a toothed blocker carried by said first member intermediate said sections and said first member for controlling engagement of said shiftable member with said first member, and lost motion means comprising a lateral projection on one of said sections interengaged with a slot in the other of said sections and with a slot in said toothed blocker, operable to provide limited relative oscillatory motion between said sections and between said shiftable member and said toothed blocker whereby said toothed blocker may be rotated into blocking relation to said shiftable member to block engaging shift of said shiftable member until the relative speeds of said one member and said shiftable member are synchronous and whereby said other section may be positioned in blocking relation to said shiftable member to block disengaging shift of said shiftable member when the latter is engaged as aforesaid with said first member and one section and undergoing drive transmission.

23. A power transmission clutch mechanism comprising in combination a first rotatable toothed drive transmitting member, a pair of toothed sections rotatable about a common axis, a shiftable toothed drive transmitting member mounted for toothed engagement with said toothed sections and for selective shifting into toothed engagement and disengagement with said first member for establishing and disestablishing drive therebetween, said shiftable member when disengaged from said first member having a position providing toothed engagement with said pair of sections and when in position engaged with said first member being in toothed engagement with one of said pair of sections and in toothed disengagement with the other of said sections, lost motion connection means in part carried by one of said sections operable to provide relative limited oscillatory motion between said sections, said means accommodating positioning of the said other section in blocking relation to said shiftable member to block disengaging shift of said shiftable member when the latter is engaged as aforesaid with said first member and one section and undergoing drive transmission, the teeth of said shiftable member having beveled ends and the adjacent ends of the teeth of said sections having substantially square ends.

24. A power transmission clutch mechanism comprising in combination a first rotatable toothed drive transmitting member, a pair of toothed sections rotatable about a common axis, a shiftable toothed drive transmitting member mounted for toothed engagement with said toothed sections and for selective shifting into toothed engagement and disengagement with said first member for establishing and disestablishing drive therebetween, said shiftable member when disengaged from said first member having a position providing toothed engagement with said pair of sections and when in position engaged with said first member being in toothed engagement with one of said pair of sections and in toothed disengagement with the other of said sections, lost motion connection means in part carried by one of said sections operable to provide relative limited oscillatory motion between said sections, said means accommodating positioning of the said other section in blocking relation to said shiftable member to block disengaging shift of said shiftable member when the latter is engaged as aforesaid with said first member and one section and undergoing drive transmission, certain teeth of said shiftable member having beveled ends and other teeth thereof having square ends set back from said beveled ends and the adjacent ends of the teeth of said sections being substantially square.

25. A power transmission clutch mechanism comprising in combination a first rotatable toothed drive transmitting member, a pair of toothed sections rotatable about a common axis, a shiftable toothed drive transmitting member mounted for toothed engagement with said toothed sections and for selective shifting into toothed engagement and disengagement with said first member for establishing and disestablishing drive therebetween, said shiftable member when disengaged from said first member having a position providing toothed engagement with said pair of sections and when in position engaged with said first member being in toothed engagement with one of said pair of sections and in toothed disengagement with the other of said sections, lost motion connection means in part carried by one of said sections operable to provide relative limited oscillatory motion between said sections, said means accommodating positioning of the said other section in blocking relation to said shiftable member to block disengaging shift of said shiftable member when the latter is engaged as aforesaid with said first member and one section and undergoing drive transmission, the adjacent ends of the teeth of said sections being substantially square, certain teeth of said shift member having beveled ends and others having square ends set back from said beveled ends and the beveled teeth of said shiftable member being of lesser thickness than the teeth thereof having the square ends.

SIDNEY A. OCHS.
OTTO E. FISHBURN.

REFERENCES CITED

The following references are of record in the file of this patent:

UNITED STATES PATENTS

| Number | Name | Date |
|---|---|---|
| 1,935,965 | Wahlberg | Nov. 21, 1933 |
| 1,997,056 | Griswold | Apr. 9, 1935 |
| 2,070,140 | Peterson et al. | Feb. 9, 1937 |
| 2,125,526 | Trimbath | Aug. 2, 1938 |
| 2,202,271 | Sinclair et al. | May 28, 1940 |
| 2,221,897 | Orr | Nov. 19, 1940 |
| 2,221,899 | White et al. | Nov. 19, 1940 |
| 2,339,969 | White | Jan. 25, 1944 |
| 2,393,153 | Fishburn | Jan. 15, 1946 |
| 2,398,407 | Brownyer | Apr. 16, 1946 |
| 2,429,789 | Bachman | Oct. 28, 1947 |